United States Patent [19]

Schwarz

[11] Patent Number: 5,729,481
[45] Date of Patent: Mar. 17, 1998

[54] METHOD AND SYSTEM OF ROUNDING FOR QUADRATICALLY CONVERGING DIVISION OR SQUARE ROOT

[75] Inventor: Eric Mark Schwarz, Gardiner, N.Y.

[73] Assignee: International Business Machines Corporation, Armonk, N.Y.

[21] Appl. No.: 414,867

[22] Filed: Mar. 31, 1995

[51] Int. Cl.$^6$ ............................................. G06F 7/38
[52] U.S. Cl. ................. 364/745; 364/752; 364/761
[58] Field of Search .......................... 364/745, 748, 364/754, 757, 760, 761, 765, 767, 735, 752

[56] References Cited

U.S. PATENT DOCUMENTS

| | | | |
|---|---|---|---|
| 4,777,613 | 10/1988 | Shahan et al. | 364/748 |
| 4,878,190 | 10/1989 | Darley et al. | 364/761 |
| 4,939,686 | 7/1990 | Fandrianto | 364/752 |
| 4,999,801 | 3/1991 | Katsuno | 364/748 |
| 5,023,827 | 6/1991 | Kehl et al. | 364/744 |
| 5,132,925 | 7/1992 | Kehl et al. | 364/764 |
| 5,191,335 | 3/1993 | Leitherer | 341/94 |
| 5,212,661 | 5/1993 | Taniguchi | 364/745 |
| 5,222,037 | 6/1993 | Taniquchi | 364/745 |
| 5,258,943 | 11/1993 | Gamez et al. | 364/745 |
| 5,305,247 | 4/1994 | Lindsley | 364/748 |
| 5,305,248 | 4/1994 | Ammann | 364/748 |
| 5,317,530 | 5/1994 | Toriumi | 364/745 |
| 5,329,475 | 7/1994 | Juri et al. | 364/745 |
| 5,341,321 | 8/1994 | Karp et al. | 364/748 |

FOREIGN PATENT DOCUMENTS

| | | |
|---|---|---|
| 0225924 | 1/1990 | Japan. |
| 9110189 | 7/1991 | WIPO. |

*Primary Examiner*—Paul P. Gordon
*Assistant Examiner*—Emmanuel L. Moise
*Attorney, Agent, or Firm*—Lynn Augspurger; Morgan & Finnegan, L.L.P.

[57] ABSTRACT

A method and system which provides exactly rounded division and square root results for a designated rounding mode independently of a remainder, or equivalent calculation of the relationship between the remainder and zero, for predetermined combinations of the rounding mode and the least significant bit of an estimate that has one more bit of precision than the exactly rounded result, and has an error tolerance magnitude less than the weight of the least significant bit of the estimate. The estimate is generated in accordance with a quadratically converging division or square root algorithm. The method and system is described in connection with IEEE 754-1985 and IBM S/390 binary floating point architectures.

9 Claims, 7 Drawing Sheets

FIG.12

METHOD AND SYSTEM OF ROUNDING FOR QUADRATICALLY CONVERGING DIVISION OR SQUARE ROOT

FIELD OF THE INVENTION

This invention is related to computers and computer systems and particularly to a method and system for computer arithmetic operations and processing.

BACKGROUND OF THE INVENTION

During the ensuing description the following references, which are herein incorporated by reference, are cited.

"Enterprise Systems Architecture/390 Principles of Operation," Order No. SA22-7201-0, available through IBM branch offices, 1990.

"IEEE standard for binary floating-point arithmetic, ANSI/IEEE Std 754-1985," The Institute of Electrical and Electronic Engineers, Inc., New York, August 1985.

R. E. Goldschmidt. "Applications of division by convergence," Master's thesis, M.I.T., June 1964.

S. F. Anderson, J. G. Earle, R. E. Goldschmidt, and D. M. Powers. "The IBM system/360 model 91: floating-point execution unit," IBM Journal of Research and Development, 11(1):34–53, January 1967.

S. Waser and M. J. Flynn. Introduction to Arithmetic for Digital Systems Designers, CBS College Publishing, New York, 1982.

M. J. Flynn. "On division by functional iteration," IEEE Trans. Comput., C.-19(8):702–706, August 1970.

S. Dao-Trong and K. Helwig, "A single-chip IBM system/390 floating-point processor in CMOS," IBM Journal of Research and Development, 36(4):733–749, July 1992.

P. Markstein, "Computation of elementary functions on the IBM RISC system/6000 processor," IBM Journal of Research and Development, 34(1):111–119, January 1990.

P. Markstein and A. K. Spencer, "Adaption of Floating Point Division Algorithm to Fixed Point Arithmetic," IBM Tech. Discl. Bulletin, 36(06B):529–533, June 1993.

A. H. Karp, P. Marstein, and D. Brzezinski, "Floating Point Arithmetic Unit using Modified Newton-Raphson Technique for Division and Square Root," U.S. Pat. No. 5,341,321, Aug. 23, 1994.

T. Taniguchi, "Apparatus for Performing Floating Point Arithmetic Operation and Rounding the Result thereof," U.S. Pat. No. 5,212,661, May 18, 1993.

H. M. Darley et al., "Floating Point/Integer Processor with Divide and Square Root Functions" U.S. Pat. No. 4,878,190, Oct. 31, 1989.

Computer arithmetic operations of division and square root as defined by various architectures such as in "Enterprise Systems Architecture/390 Principles of Operation" or in "IEEE standard for binary floating-point arithmetic, ANSI/IEEE Std 754-1985", cited above, define an exactly rounded result. Specifically, the Systems Architecture/390 reference prescribes that the result for the floating point division operation be equal to taking an infinitely precise quotient and truncating it to the precision specified (short: 24 bits, long: 56 bits, or extended: 112 bits), and for square root the infinitely precise result is rounded to the nearest machine representable number. The IEEE 754 standard, which includes a single (24 bit), double (53 bit) and double extended format (63 or greater bits), specifies that the results of any arithmetic operation including divide and square root need to be rounded to any of four rounding modes. These modes are called round to nearest even, round to zero, round to positive infinity, and round to negative infinity. Round to nearest even selects the closest machine representable number to the result, and if there are two such numbers then the even number is selected as the result. This mode removes the bias that is associated with the conventional round to nearest mode, which "rounds up" in the half way case. Round to zero discards the fractional bits that don't fit in the machine representation, and is often termed truncation. Round to positive infinity rounds to the next larger machine representable number, while round to negative infinity rounds to the next smaller representative number. All these modes are defined to have a result equal to taking an infinitely precise result and rounding it to desired precision (i.e., exactly rounded).

Some arithmetic processing apparatae use convergence-type division or square root operations, such as the quadratically converging Newton-Raphson algorithm and Goldschmidt algorithm. Details of these algorithms are given in text books on computer arithmetic such as the book by Waser and Flynn. The first detailed work on Goldschmidt's algorithm is Goldschmidt's Master's Thesis cited above, and a discussion of its implementation on the IBM 360 and 91 is given in Anderson et al. For convergence-type division or square root operations there are several well-known methods of calculating an exactly rounded result. Two of the most common methods are rounding by calculating to twice the desired accuracy and rounding by calculating the remainder for all cases.

Specifically, in Waser and Flynn's book, cited above, it is suggested that the result be calculated to twice the needed precision to perform exact rounding. In terms of latency, this results in the negative effect of requiting an additional iteration of the algorithm. An implementation of the Newton-Raphson algorithm which follows this method of rounding is the RS/6000 as described by Markstein in the IBM Journal of Research and Development. Also, U.S. Pat. No. 5,341,321 shows a mechanism for calculating Newton-Raphson algorithm to twice the accuracy with one additional iteration but using the same width dataflow.

For the Goldschmidt algorithm it is difficult to get twice the number of bits correct. The Goldschmidt algorithm is not selfcorrecting; a truncation error in an iteration will cause error in the next iteration, unlike the Newton-Raphson algorithm. Yet, compared to the Newton-Raphson algorithm, the Goldschmidt algorithm provides certain advantages in terms of computational efficiency because of the possibility for parallel calculation of intermediate results during each iteration. To avoid truncation errors, a straight-forward, "brute force" method of implementing exact rounding by calculating to twice the desired accuracy for the Goldschmidt algorithm would require the dataflow to accommodate twice the width operands, which corresponds to an unreasonable amount of hardware. Also, even if providing the necessary additional hardware were not deemed unreasonable, this method of calculating to twice the desired accuracy is not computationally efficient since it inherently requires at least one additional iteration of the Goldschmidt algorithm.

Other researchers have considered calculating the remainder to determine which direction to round based on a comparison of the remainder with zero. Markstein and Spencer, in an IBM Technical Disclosure Bulletin, use the Goldschmidt algorithm to produce an approximation within a unit in last place (ulp) of the desired accuracy, and then compute the remainder, which is then used to determine whether to increment or truncate the approximation to compute an exactly truncated result. Darley et al. in U.S. Pat. No. 4,878,190 describe a Newton-Raphson algorithm for division and square root for the IEEE 754 architecture which includes computing an equivalent to a remainder and testing its relation to zero, wherein a reduced number of bits is needed in the comparison. Also, Taniguchi in U.S. Pat. No. 5,212,661 discloses a rounding algorithm for square root and divide which considers the approximate result to be generated using any convergence algorithm, and wherein an equivalent operation to a remainder calculation is performed followed by a comparison to zero. As in Darley et al., Taniguchi uses a reduced number of bits in the comparison. Note that this type of rounding algorithm requires the calculation of the remainder, or an equivalent operation, for all cases and rounding is based on comparison of the remainder with zero.

In addition, several patents illustrate techniques for performing a floating point division or square root operation. U.S. Pat. No. 4,999,801, issued Mar. 12, 1991 to Akira Katsuno, deals with the Newton-Raphson algorithm for division and square root but does not discuss calculating an exactly rounded result. U.S. Pat. No. 5,132,925, issued Jul. 21, 1992 to T. H. Kehl et al., is directed to a non-restoring division algorithm. Non restoring algorithms are not quadratically converging, and calculate a remainder as part of their basic iteration. U.S. Pat. No. 5,305,247, issued Apr. 19, 1994 to B. L. Lindsely, discloses a Newton-Raphson algorithm for division and square root that includes a range reduction technique to speed up convergence, but does not discuss exactly rounding the intermediate results to those dictated by the IEEE 754 standard or IBM S/390 architecture.

There remains, therefore, a need for further improvements in implementing floating point division and square root operations to provide an exactly rounded result in a designated rounding mode.

SUMMARY OF THE INVENTION

The present invention overcomes the above, and other limitations, of the prior art by a method and system which provides exactly rounded division and square root results for a designated rounding mode according to a quadratically converging operation, and which requires no additional iterations of the quadratically converging operation, and which does not require determining a relationship of the remainder to zero in all cases for performing a rounding operation.

An embodiment of the present invention, employed in accordance with a floating point arithmetic unit, provides an N-bit exactly rounded result for a designated rounding mode by a method that includes the steps of generating an approximate result having N+1 bits and an error tolerance of less than plus or minus the least significant (N+1th) bit, N being a positive, nonzero integer, the N+1th bit referred to as the guard bit; and providing an exactly rounded result based on the value of the guard bit and the designated rounding mode, independently of a relationship of a remainder to zero, for predetermined combinations of the designated rounding mode and the guard bit. For other predetermined combinations of the rounding mode and the guard bit, a relationship of a remainder to zero is determined, and the exactly rounded result is provided according to the designated rounding mode and the remainder relationship to zero. Generally, for any rounding mode, the exactly rounded result will be one of the following: the N most significant bits of the approximate result, referred to as the truncated approximate result; or the truncated approximate result incremented by one unit in the least significant bit; or the truncated approximate result decremented by one unit in the least significant bit. Also in accordance with the present invention, an apparatus that provides an N-bit exactly rounded result in a designated rounding mode for floating point division or square root operations comprises: means for providing an N+1 bit approximate result having an error tolerance of less than plus or minus the least significant (N+1th) bit, referred to as the guard bit; means for detecting the designated rounding mode; means for generating a remainder output signal indicative of a relationship between zero and a remainder representative of a difference between an infinitely precise result and an approximate result to the division or square root operation; means for providing an incremented result by incrementing the N most significant bits of the approximate result by 1 unit in the least significant bit; means for providing a decremented result by decrementing the N most significant bits of the approximate result by 1 unit in the least significant bit; and means for selecting any one of the incremented result, decremented result, or the N most significant bits of the approximate result as an output representing the exactly rounded result, wherein for predetermined combinations of the guard bit and the designated rounding mode the exactly rounded result is selected independently of the remainder output signal, and wherein for other predetermined combinations of the guard bit and the designated rounding mode the exactly rounded result is provided according to the designated rounding mode and the remainder output signal.

A feature of the present invention is that a method and apparatus is provided for arithmetic processing of divide and square root intermediate results to perform exact rounding of these results.

Another feature of the present invention is that an exactly rounded result is provided for the Goldschmidt algorithm without requiring the dataflow to accommodate operands having twice the width of the desired accuracy.

A further feature of the present invention is that exactly rounded division and square root results which are compliant with an architecturally defined rounding mode are provided with elimination of extra cycles of a quadratically converging algorithm.

Yet another feature of the present invention is that exactly rounded division and square root results for designated rounding modes are provided in accordance with a method and system that achieves reduced processing time at little or no cost in terms of design complexity or chip real estate.

Yet a further feature of the present invention is that it provides exactly rounded division and square root results for a designated rounding mode according to a quadratically converging operation without requiring additional iterations of the quadratically converging operation.

Still another feature of the present invention is that it provides exactly rounded division and square root results for a designated rounding mode according to a quadratically converging operation without requiring that a relationship between a remainder and zero be calculated for all cases of the rounding operation.

BRIEF DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE INVENTION

Figure 1A:
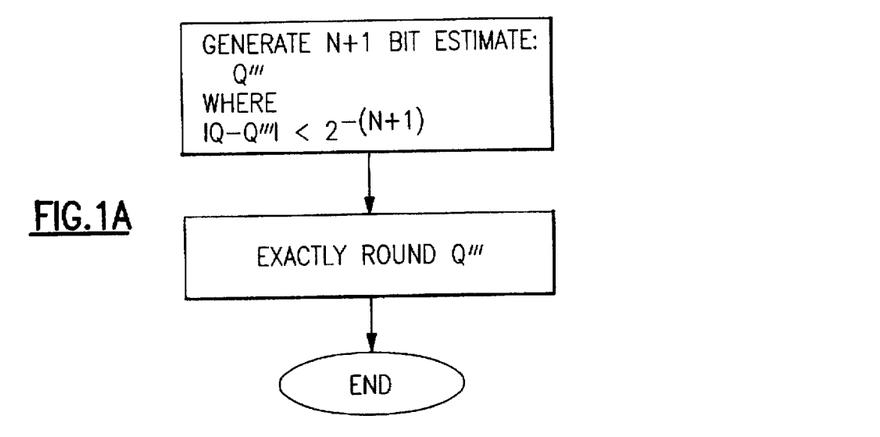
FIG. 1A shows the basic steps of implementing a preferred embodiment of the present invention of providing, for a specified rounding mode, an exactly rounded result of a division or square root operation.

In FIG. 1A, there are shown the basic steps of implementing a preferred embodiment of the present invention of providing, for a specified rounding mode, an exactly rounded result of a division or square root operation wherein the exactly rounded result has a desired precision of N bits. (Throughout the description, for a word having m bits, the least significant bit is referred to as the "mth bit" or the "last bit".) First, in step 101, an N+1 bit estimate of the exact result is generated having an error tolerance of less than plus or minus the weight of the N+1th least significant bit (i.e., $2^{-(N+1)}$, where the most significant bit is weighted $2^{-1}$). For instance, in the IEEE 754 standard, 53 bits is the required precision for long and thus, a 54 bit approximation, with an error tolerance of less than plus or minus $2^{-54}$, would be needed to generate an exactly rounded result according to the presently disclosed invention. Such an estimate may be provided directly as the result of a quadratically converging algorithm; however, more generally, a quadratically converging algorithm provides a preliminary result with several extra bits of precision compared to N, the desired number of bits, prior to rounding.

Thus, in accordance with practicing the present invention, it is useful to illustrate, by way of example, a description of a technique used to reduce a high precision approximation into an N+1 bit approximation with strict error tolerances.

Assume the actual (infinitely precise) result is called Q and that an exactly rounded machine representable number (to any of 5 types of rounding modes) is to be calculated. Assume Q* is the needed answer which has N bits of accuracy and that the results have been normalized, Q<1.0 and for hex normalization is greater than or equal to 1/16 and for binary normalization is greater than or equal to ½. Assume a preliminary answer Q' is available which has N+k bits with an error of plus or minus $2^{-(N+M)}$ where k≧M>0. That is:

$$-2^{-(N+M)} \leq Q-Q' \leq +2^{-(N+M)}$$

Q' needs to be transformed into an N+1 bit number with an accuracy of plus or minus the last bit, which is weighted $2^{-(N+1)}$. To do this, first Q' is incremented by more than $2^{-(N+M)}$ but less than $2^{-(N+1)}$. Assume Q' is incremented by $2^{-(N+2)}$, the result called Q'':

$$-2^{-(N+2)}-2^{-(N+M)} \leq Q-Q'+2^{-(N+2)} \leq -2^{-(N+2)}+2^{-(N+M)}$$

$$-2^{-(N+2)}-2^{-(N+M)} \leq Q-Q'' \leq -2^{-(N+2)}+2^{-(N+M)}$$

Q'' is an overestimate of Q. The next step is to truncate this overestimate to N+1 bits which reduces the estimate by some amount from 0 up to $2^{-(N+1)}$, the result being called Q''':

$$-2^{-(N+2)}-2^{-(N+M)}+e \leq Q-(Q''-e) \leq -2^{-(N+2)}+2^{-(N+M)}+e$$

where: $0 \leq e < 2^{-(N+1)}$ $$-2^{-(N+2)}-2^{-(N+M)} \leq Q-Q''' < +2^{-(N+2)}+2^{-(N+M)}$$

$$-2^{-(N+2)}-2^{-(N+M)} \leq Q-Q''' < +2^{-(N+2)}+2^{-(N+M)}$$

If M=2 then:

$$-2^{-(N+1)} \leq Q-Q''' < +2^{-(N+1)}$$

whereas, if M>2 then:

$$-2^{-(N+1)} < Q-Q''' \leq +2^{-(N+1)}$$

Preferably, M>2 such that the error tolerance does not include a boundary value. It may be understood, however, that the present invention may also be practiced according to M=2; however, as will be further understood below, choosing M=2 generally will result in a greater percentage of cases in which a relationship between a remainder and zero must be determined for rounding, and therefore, does not yield all the advantages of the present invention. With M>2, the latter equation may be rewritten as:

$$Q'''-0.5 \text{ ulp} < Q < Q'''+0.5 \text{ ulp}$$

where 1 ulp is defined to be a unit in the last place of Q* and since Q* is an N bit fraction, 1 ulp=$2^{-N}$. The estimate Q''' is N+1 bits and has error of less than plus or minus the least significant of the N+1 bits, which for Q''' is considered to be, and referred to as, the guard bit G.

It may be appreciated that calculating one extra bit of precision for the approximate result, in most cases, does not require any additional latency since it is typical to produce a preliminary result with a few bits of extra precision prior to rounding because quadratically converging algorithms approximately double the number of correct bits each iteration, and most microprocessors implement double (53 bits) or long precision (56 bits).

Referring again to FIG. 1A, the N+1 bit estimate, Q''', is then rounded to an exactly rounded result of N bits according to the selected rounding mode and the value of the guard bit (step 103). Generally, the exactly rounded result is one of the following values: Q''' truncated to N bits, referred to as trunc(Q'''); trunc(Q''') incremented by one unit in the last place (i.e., the least significant bit of trunc(Q''')); or, trunc (Q''') decremented by one unit in the last place. In some cases (defined by the selected rounding mode and the value of the guard bit), which of these values is selected as the exactly rounded result may be determined based solely on the rounding mode and the value of the guard bit—without determining a relationship between zero and a remainder; in other cases, the relationship between zero and a remainder must be determined to decide which value to select.

For a given rounding mode and guard bit value, which value is selected as the exactly rounded result, and whether a relationship between zero and a remainder must first be determined, may be better understood with reference to FIGS. 2–7, which illustrate relative number lines for different cases. In each of FIGS. 2–7, a vertical number line is pictured with machine representable numbers (indicated by "N bits") and halfway points between machine representable numbers (indicated by "N+1 bits"). xxx is used to denote the last few (least significant) bits of Q''' through the Nth bit, and a 1 or a 0 is attached as the value of the N+1th bit (i.e., the guard bit G) of Q'''. yyy is used to indicate the next higher machine representable number and a 0 is shown in the N+1th bit position to indicate that it is exactly machine representable with N bits. www is used to represent the next machine representable number smaller than xxx; the N+1 bit number www1 being halfway between www (i.e., www0) and xxx (i.e., xxx0). A vertical dashed line terminated with "0" is used to denote the range of possible values for Q. Note that the point indicated by "0" is not included in this range since the range of Q is strictly less than or greater than these points and not inclusive. Also shown in some figures is the relative value of the remainder (in terms of sign) for given ranges of Q. The choice of Q* is sometimes shown as well.

In the description of FIGS. 2–7, subscripts denote the width of the operands being considered, where N is the desired precision. From a hardware standpoint, these widths are very important since it is common to have an N by N bit multiplier or even and N by N+M bit multiplier (which is the case considered in the herein embodiments), but it is not typically reasonable to expect an implementation to have an N+M by N+M bit multiplier. Also in this description, the remainder is denoted by "rem".

Round to Nearest and Round to Nearest Even Modes

Figure 2:
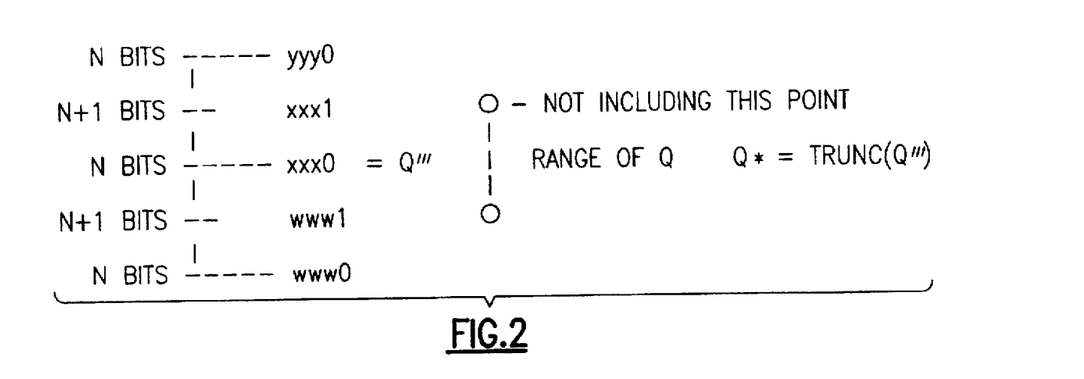
FIG. 2 shows a number line diagram of the range that the infinitely precise quotient, denoted by Q, can be in relation to the N+1 bit approximation, denoted by Q''' for the round to nearest mode and the guard bit equal to zero, in accordance with practicing the present invention.

FIG. 2 shows a number line for the case where the selected mode is either round to nearest or round to nearest even, and the value of the guard bit is zero (i.e., G=0). Thus, in accordance with the defined notation, Q''' is shown equal to xxx0. The range of Q is less than xxx1 and greater than www1. It may be understood, therefore, that the exactly rounded result Q*=Trunc(Q''') for both round to nearest and round to nearest even, since there is no halfway case to consider. Note that no relationship between zero and a remainder (aim referred to as the relative remainder value) need be determined for this case.

Figure 3:
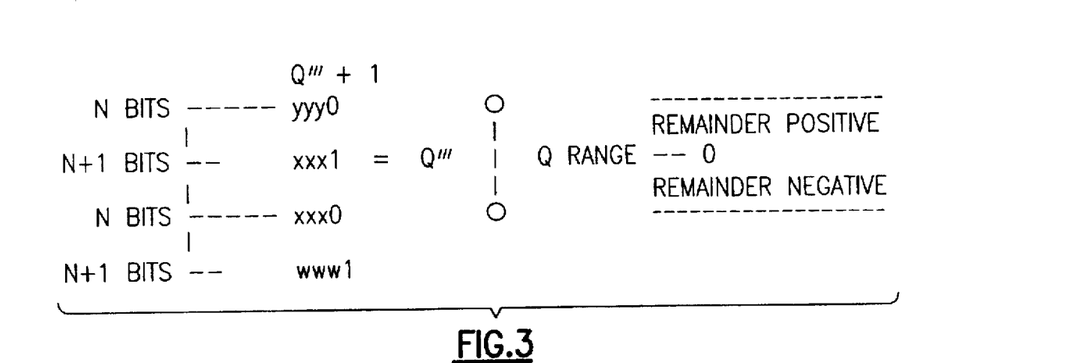
FIG. 3 shows a number line diagram of the range that the infinitely precise quotient, denoted by Q, can be in relation to the N+1 bit approximation, denoted by Q''' for the round to nearest mode and the guard bit equal to equal to one, in accordance with practicing the present invention.

FIG. 3 shows a number line for the case where the selected mode is either round to nearest or round to nearest even, and the value of the guard bit is one (i.e., G=1). Accordingly, Q''' is shown equal to xxx1, and the range of Q falls between yyy0 and xxx0. It may be understood from FIG. 3 that for both the round to nearest and round to nearest even modes Q* will equal yyy if Q is greater than Q''', and will equal xxx if Q is less than Q'''. If Q equals Q''' to within the precision expressed by Q''' (i.e., the half way case), then for round to nearest mode Q* should equal yyy, while for round to nearest even mode the even one of the values xxx and yyy should be selected as the exactly rounded result. Thus, in order to determine an exactly rounded result, the relationship between zero and a remainder for the operation must be determined using the N+1 bit estimate Q'''.

Considering a multiplier that has an N+1 bit input and an N bit input for the two multiplicands, computation of the product (Q'''*A) as part of the relative remainder value determination for the division operation may be directly implemented with such a multiplier since the dividend, A, is N bits. That is, for division of B/A, the remainder is calculated as follows:

$$rem = B_{N \text{ bits}} - A_{N \text{ bits}} * Q'''_{N+1 \text{ bits}}$$

However, for the square root operation (e.g., √D), directly calculating the product (Q'''*Q''') as part of the relative remainder value determination may not be implemented with such a multiplier since Q''' is N+1 bits wide and one of the multiplier inputs is only N bits wide. It is possible, however, to calculate the product Q'''*Q''' by performing an N+1 bit by N bit multiplication, followed by an addition, as may be understood from the following.

For square root:

$$rem = D - (Q'''_{N+1 \text{ bits}})^2$$

which, for G=1 may be written as:

$$rem = D - [Trunc(Q''')_{N \text{ bits}} + 0.5 \text{ ulp}] * Q'''_{N+1 \text{ bits}}$$

$$rem = D - [Trunc(Q''')_{N \text{ bits}} * Q'''_{N+1 \text{ bits}} + Q'''_{N+1 \text{ bits}} * 2^{-(N+1)}]$$

That is, the multiplier forms the product of Trunc(Q''') and Q''', and the result is added to Q''' which is offset the appropriate number of bits, thus yielding the product of Q'''*Q'''. In effect, multiplier hardware is simplified by requiring an addition operation and related hardware. The remainder is calculated by subtracting this product from D (alternatively, determining the remainder value relative to zero may be performed by comparing the product with D). Of course, in some implementations an N+1 by N+1 bit multiplier may be a preferred implementation and thus, direct calculation of the product $Q'''*Q'''$ may be performed by the multiplier.

Once the relative remainder value is determined, the exactly rounded result may be selected as follows. If rem>0, indicating that $Q'''$ is too small, then $Q^*=\text{Trunc}(Q''')+1$ ulp; if rem<0 then $Q^*=\text{Trunc}(Q''')$. It can be proven that there are no half way results (i.e., rem=0) when G=1 for square root or division operations and thus, there is no need to distinguish between round to nearest and round to nearest even for such cases.

Round to Infinity with Same Sign

Figure 4:
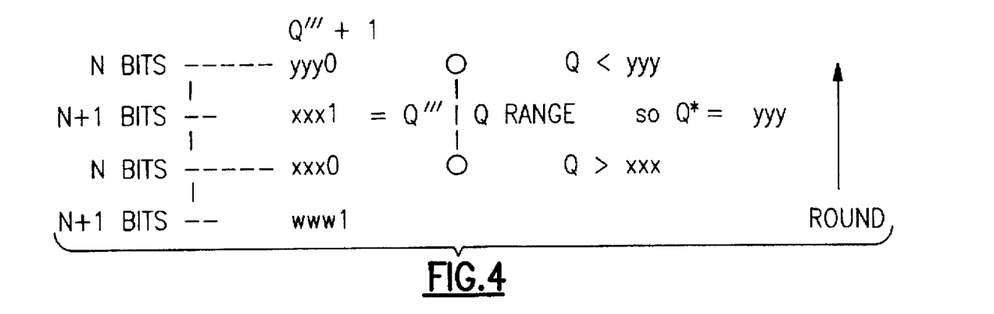
FIG. 4 shows a number line diagram of the range that the infinitely precise quotient can be in relation to the N+1 bit approximation for the round to infinity with the same sign mode and the guard bit equal to zero, in accordance with practicing the present invention.
Figure 5:
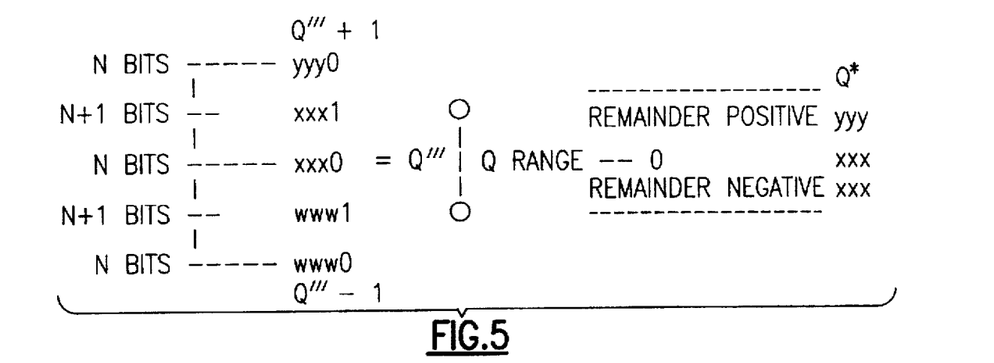
FIG. 5 shows a number line diagram of the range that the infinitely precise quotient can be in relation to the N+1 bit approximation for the round to infinity with the same sign mode and the guard bit equal to one, in accordance with practicing the present invention.

FIG. 4 and FIG. 5 show number lines for Round to Infinity/Same Sign which refers to either the round to positive infinity mode with Q positive, or the round to negative infinity mode with Q negative. More particularly, FIG. 4 shows a number line for Round to Infinity/Same Sign and G=1, from which it can be seen that $Q^*=\text{Trunc}(Q''')+1$ ulp (i.e., yyy). The arrow shown indicates the direction of the next larger machine representable number.

Alternatively, FIG. 5 specifically shows a number line for Round to Infinity/Same sign and G=0, from which it can be seen that the exactly rounded result will either be xxx or yyy depending on whether Q falls not above or above xxx0, respectively. Thus, a relative remainder value must be determined. Note, however, that in determining the relative remainder value $\text{Trunc}(Q''')_{N\ bits}$ (i.e., which is N bits) may be used because G=0. Thus, for square root:

$$rem=D-(\text{Trunc}(Q''')_{N\ bits})^2$$

while for division:

$$rem=B_{N\ bits}-A_{N\ bits}*\text{Trunc}(Q''')_{N\ bits}$$

Then, for either division or square root, if rem>0 (i.e., $Q'''$ not big enough) then $Q^*=\text{Trunc}(Q''')+1$ ulp, whereas if rem≦0 then $Q^*=\text{Trunc}(Q''')$.

Round to Infinity with Opposite Sign

Figure 6:
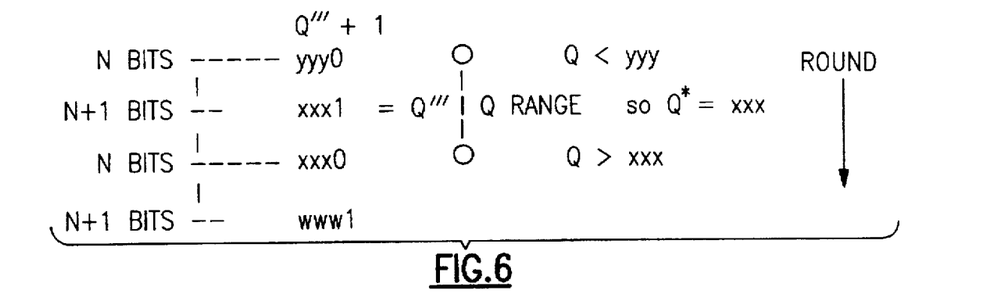
FIG. 6 shows a number line diagram of the range that the infinitely precise quotient can be in relation to the N+1 bit approximation for the round to infinity with opposite sign, round to zero, or truncate mode, and the guard bit equal to zero, in accordance with practicing the present invention.
Figure 7:
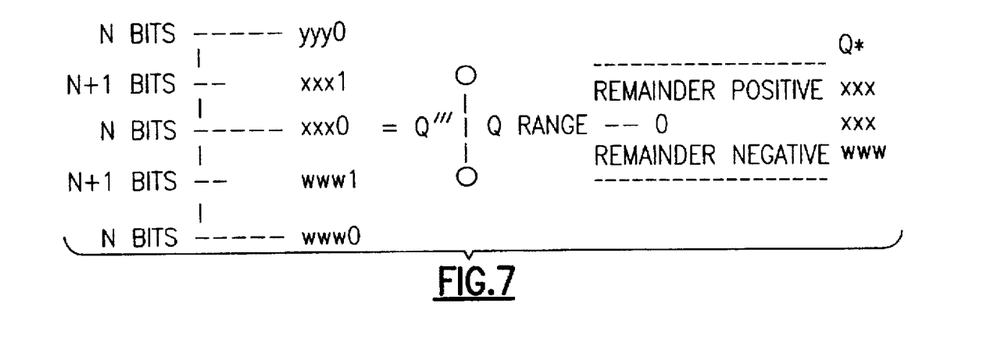
FIG. 7 shows a number line diagram of the range that the infinitely precise quotient can be in relation to the N+1 bit approximation for the round to infinity with the opposite sign, round to zero, or truncate mode, and the guard bit equal to one, in accordance with practicing the present invention.

FIG. 6 and FIG. 7 show number lines for Round to Infinity/Opposite Sign which refers to either the round to positive infinity mode with Q negative, or the round to negative infinity mode with Q positive. These number lines are also applicable to the Round to Zero and the Truncate modes. More particularly, FIG. 6 shows a number line for Round to Infinity/Opposite Sign (or Round to Zero, or Truncate) and G=1, from which it can be seen that $Q^*=\text{Trunc}(Q''')$ (i.e., xxx). The arrow shown indicates the direction of the next smaller machine representable number.

FIG. 7 specifically shows a number line for Round to Infinity/Opposite Sign (or Round to Zero, or Truncate) and G=0, from which it can be seen that the exactly rounded result will either be www or xxx depending on whether Q falls not below or below xxx0, respectively. Thus, a relative remainder value must be determined. As mentioned for FIG. 5, note that in determining (i.e., computing) the relative remainder value $\text{Trunc}(Q''')_{N\ bits}$ (i.e., which is N bits) may be used because G=0. Then, for either division or square root, if rem≧0 then $Q^*=\text{Trunc}(Q''')$, whereas if rem<0 (i.e., magnitude of $Q'''$ too large) then $Q^*=\text{Trunc}(Q''')-1$ ulp.

Thus, according to an embodiment of the present invention, a method of providing an exactly rounded result to a division or square root operation for a selected rounding mode includes the following steps: generating an N+1 bit approximate estimate having an error tolerance of less than plus or minus the weight of the (N+1)th bit, referred to as the guard bit; determining a relative remainder value for a first set of predetermined combinations of the rounding mode and the guard bit; providing an exactly rounded result according to the selected rounding mode, and the value of the guard bit, independently of the relative remainder value for a second set of predetermined combinations of the rounding mode and the guard bit, the second set of predetermined combinations mutually exclusive from the first set (i.e., a set element representing both the rounding mode and the guard bit); and providing the exactly rounded result according to the rounding mode and the relative remainder value for the first set of predetermined combinations. The rounding technique is applicable to both square root and division operations. As a result of this method, in about half the cases prescribed by the rounding mode and the guard bit, a truncated or incremented preliminary result (also referred to as the estimate $Q'''$) can be guaranteed to be the exactly rounded result based solely on the selected rounding mode and the value of the guard bit. In the remaining cases, in order to provide an exactly rounded result, the sign of the remainder needs to be calculated and the preliminary result conditionally truncated, incremented, or decremented according to the remainder. Thus, in about half the cases, the rounding method of the present invention saves additional processor cycles by eliminating the calculation of a relative remainder value for rounding. It may be understood that the present invention is preferably practiced in accordance with quadratically converging algorithms for division and square root since algorithms that are not quadratically converging (e.g., non-restoring algorithms) calculate a remainder as part of their basic iteration and thus, would not benefit significantly from eliminating the calculation of the relative remainder value during rounding compared with the benefits to quadratically converging algorithms, which do not calculate a remainder as part of their basic iteration.

Figure 1B:
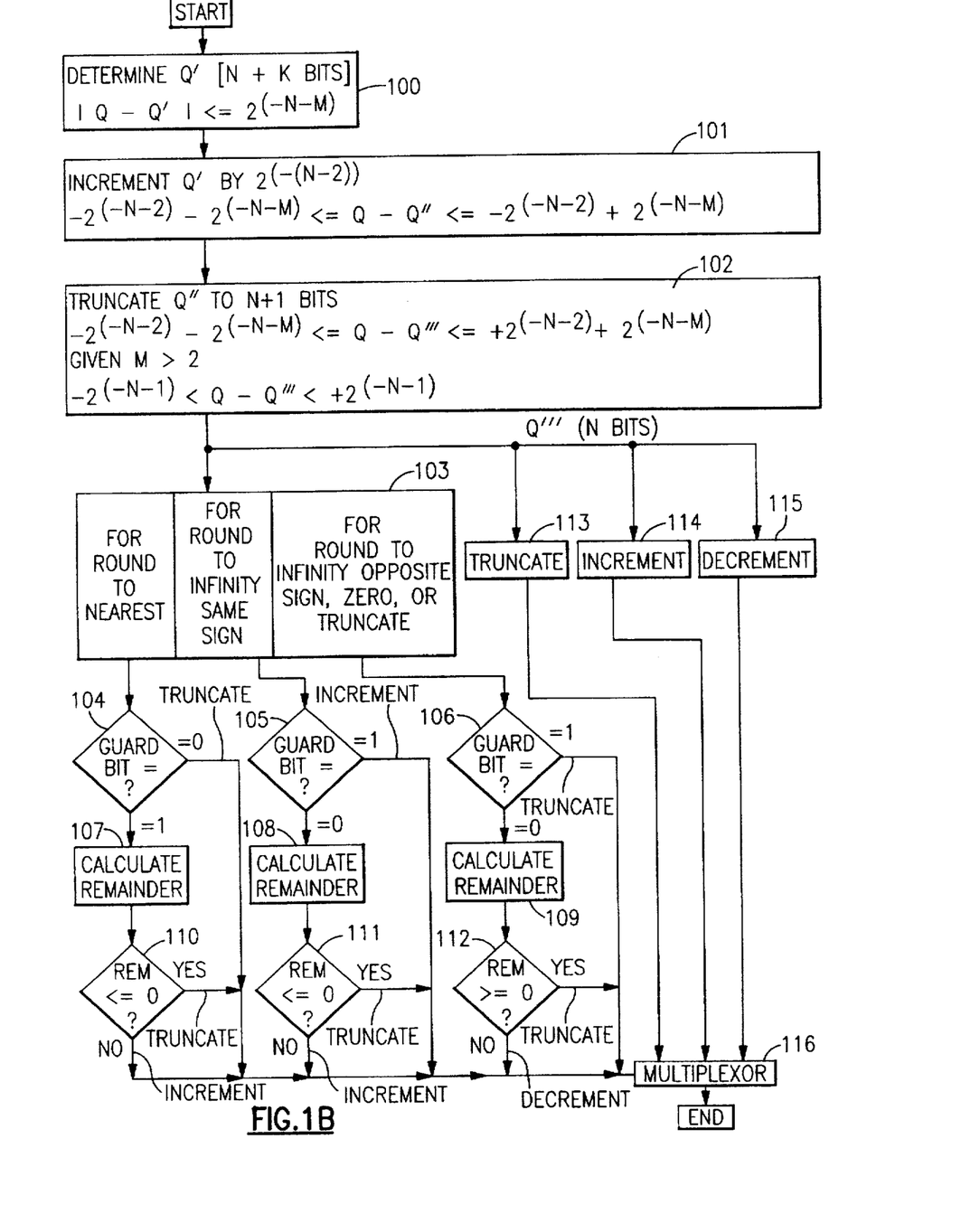
FIG. 1B shows schematically an overview of a preferred embodiment represented in functional block format.

Turning now to FIG. 1B, a preferred embodiment of the present invention is shown in functional block format. In block 100, the approximate result is calculated to N+k bits of precision where N is the desired precision and k is greater than 2. This approximation has an error tolerance of less than or equal to N+M bits where M is greater than 2.

The approximation of block 100 is called Q' and is input into block 101 which increments the approximation by $2^{-(N+2)}$, resulting in an approximation which is an overestimation and is denoted by the symbol Q".

Q" is output of block 101 and sent to block 102 which truncates Q" to N+1 bits. The resulting error tolerance of this new signal Q'" (i.e., the estimate signal) is less than plus or minus the weight of the guard bit (i.e., $2^{-(N+1)}$).

The resulting Q'" is N+1 bits, and the N+1th bit (i.e., the guard bit) is driven to a rounding mode decision block 103, and the most significant N bits are driven to truncation unit 113, increment unit 114, and decrement unit 115. Truncation unit 113 transfers the N bits from its input to its output, providing any required buffering. Increment unit 114 generates and outputs the signal Trunc(Q'") +1, while decrement unit 115 generates and outputs the signal Trunc(Q'")−1. The rounding mode decision block 103 determines a control path to take based on the rounding mode dictated by the architecture or an architected facility.

If the rounding mode desired is round to nearest or round to nearest even, compare circuit 104 is invoked to inspect the guard bit. If the guard bit is a 0, then compare circuit 104 generates a multiplexer selection signal that results in the output of truncation unit 113 being selected as the output of the multiplexer 116. If the guard bit is equal to a 1, then the relative remainder value is calculated by remainder circuit 107, and then compare circuit 110 is invoked. If the remainder is less than 0 compare circuit 110 outputs a multiplexer selection signal such that the truncation unit 113 output is selected at the output of the multiplexer 116. If the remainder is greater than zero, a multiplexer selection signal is generated such that the increment output of increment unit 114 is output of multiplexer 116. As stated above, when the guard bit is equal to a 1, the remainder cannot equal zero for the division or square root operation and thus, the round to nearest mode and the round to nearest even mode are effectively the same mode.

If the rounding mode desired is round to positive infinity and Q''' is positive, or round to negative infinity and Q''' is negative (collectively referred to as round to infinity same sign), compare circuit 105 is applied to the guard bit. If the guard bit is a 1, then the output of increment unit 114 is selected as the output of the multiplexer 116. If the guard bit is equal to a 0, then the relative remainder value is calculated by remainder circuit 108, and then compare circuit 111 is invoked. If the remainder is less than or equal to 0 then the truncated output of truncation unit 113 is selected as the output of multiplexer 116. If the remainder is greater than zero, the incremented output of increment unit 114 is selected as the output of multiplexer 116.

If the rounding mode desired is round to positive infinity and Q''' is negative, or round to negative infinity and Q''' is positive (collectively referred to as round to infinity opposite sign); or truncate, or round to zero, compare circuit 106 is applied to the guard bit. If the guard bit is a 1, then the truncated output of truncation unit 113 is selected as the output of the multiplexer 116. If the guard bit is equal to a 0, then the relative remainder value is calculated by remainder circuit 109, and then compare circuit 112 is invoked. If the remainder is greater than or equal to 0 then the truncated output of truncation unit 113 is selected as the output of the multiplexer 116. If the remainder is less than zero, the decremented output of decrement unit 115 is selected as the output of multiplexer 116.

Thus, for any of the rounding modes, the output of multiplexer 116 is the desired exactly rounded result, and in about one half the cases, an output of multiplexer 116 may be selected based solely on the rounding mode and the value of the guard bit, without invoking a relative remainder value calculation.

It may be appreciated that the foregoing embodiment of the present invention represents a functional description of the elements that may be employed, and that such an embodiment is subject to many specific implementation variations or modifications. For instance, the remainder calculation circuits 110, 111, and 112 can be a common circuit. Also, the truncate circuit 113 can be thought of as transmitting its N bit input directly to its N bit output and not performing any function; that is, N bits of Q''' may be hardwired to one of the input ports of multiplexer 116 without passing through any active circuit elements, truncate circuit 113 merely shown for clarity of exposition to describe the signal input to the multiplexer. Furthermore, for purposes of describing the logical flow, rounding mode decision block 103 is shown as receiving the guard bit output from block 102 such that decision block 103 functions to select one of the paths that generates a multiplexer selection signal by inspecting the guard bit and conditional calculating a remainder. It may be understood, however, that to perform this function decision block 103 does not necessarily receive the guard bit from block 102; the guard bit may be directly routed from block 102 to each of decision circuits 104, 105, and 106, and the decision block 103 used to appropriately enable/disable the respective paths that generates a multiplexer selection signal. Moreover, it is understood that generating an initial approximation to the given bounds of Q''' is not limited to using the steps denoted by 100, 101, and 102, but may be generated by equivalent processing or as the direct result from a converging division or square root algorithm. Some of these variations may be understood further in accordance with the ensuing embodiment of the present invention.

Figure 8:
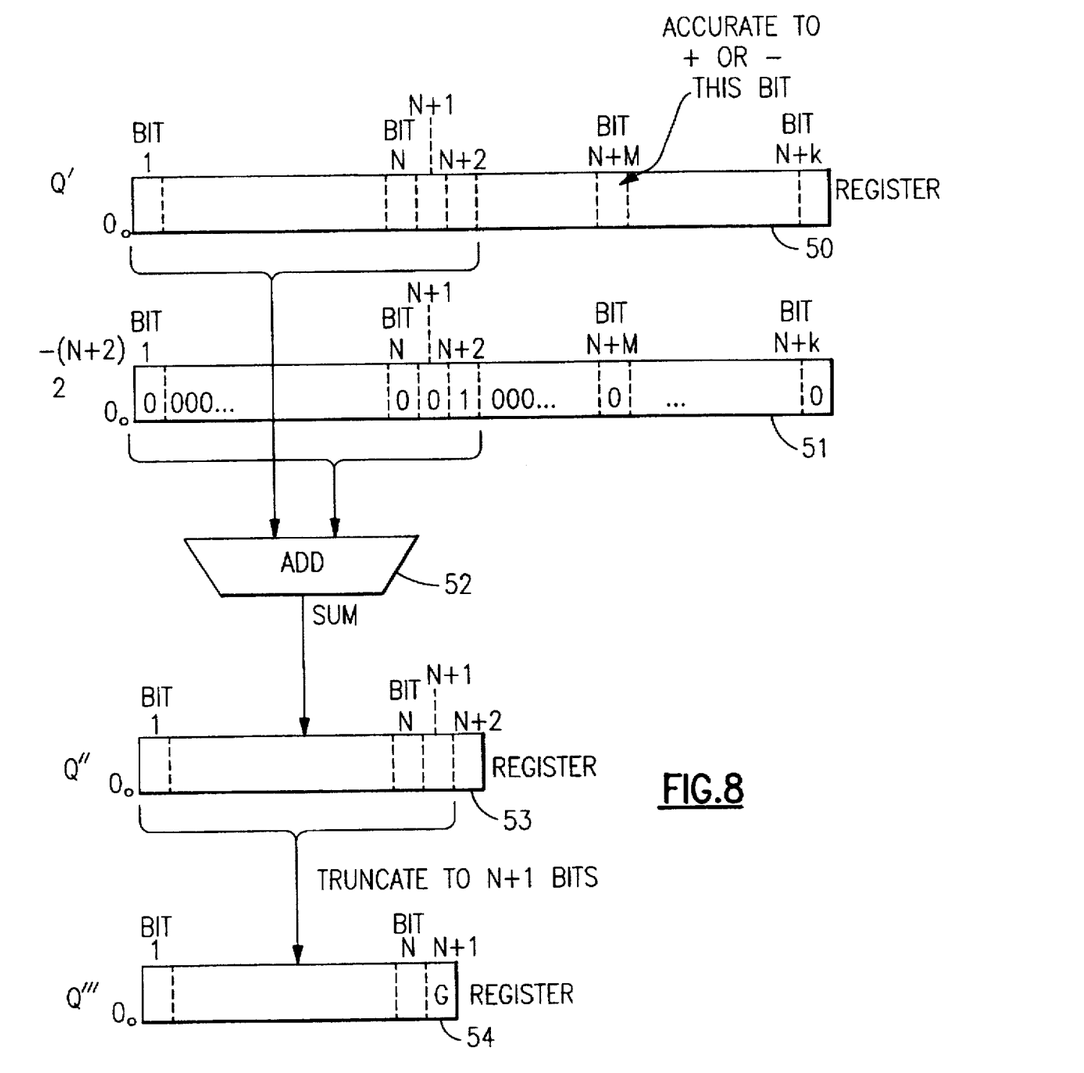
FIG. 8 illustrates circuitry involved in generating a preliminary rounded result (i.e., estimate Q''') from an approximation Q' generated as the result of a quadratically converging algorithm, in accordance with an embodiment of the present invention.

Another embodiment of the present invention is shown in FIGS. 8–12. FIG. 8 illustrates circuitry involved in generating a preliminary rounded result (i.e., estimate Q''') from an approximation Q' generated as the result of a quadratically converging algorithm. As discussed above, to perform a division or square root operation, a quadratically converging method and associated circuitry is employed to provide a preliminary answer Q' which has N+k bits with an error of plus or minus $2^{-(N+M)}$ where $k \geq M > 0$ (e.g., N=53, M=4, and k=11). Q' is schematically shown as being stored in register 50 as the result from, for example, a Goldschmidt algorithm, which generally proceeds as follows for computing the division of B/A.

First, an n-bit accurate approximate reciprocal of A, $R_o$, is obtained from a look-up table preferably stored in read-only-memory (ROM). Typically, and for clarity of exposition in describing the Goldschmidt algorithm, $R_o$ may contain about 10 bits and may be approximately 8 bits correct (i.e., n=8). Then, in a first iteration, the following calculations are performed:

$$B_1 = B * R_o$$

$$A_1 = A * R_o$$

$$R_1 = 2 - A_1$$

where $B_1$ also has an accuracy of about n bits (e.g., 8 bits), B and A may each be represented by 56 bits, $B_1$ is a first order approximate quotient, and convergence factor $R_1$ is the two's complement of $A_1$ and may include about 66 bits. It is understood that convergence factor $R_1$ differs from one by less than $2^{-n}$ (e.g., 1/256). The following analogous calculations are then performed in a second iteration:

$$B_2 = B_1 * R_1$$

$$A_2 = A_1 * R_1$$

$$R_2 = 2 - A_2$$

Now, the second order approximate quotient $B_2$ is approximately 2n bits (e.g., 16 bits) correct, assuming no truncation error, and convergence factor $R_2$ differs from one by less than about $2^{-2n}$. Similarly, another iteration is performed, namely:

$$B_3 = B_2 * R_2$$

$$A_3 = A_2 * R_2$$

$$R_3 = 2 - A_3$$

and the third order approximate quotient $B_3$ is about 4n bits correct. Now, to provide an approximate quotient having about 8n bits (e.g., 64 bits) correct, the product $B_4=B_3*R_2$ may be formed; however, this equation is typically not implemented due to truncation errors.

Instead, it is observed that convergence factor $R_3$ is about 4n bits correct (i.e., $R_3$ differs from one by less than $2^{-4n}$), specifically indicating that the first 4n bits of $R_3$ are either all 0 or all 1, depending on whether $R_3$ is greater than or less than one, respectively. For purposes of reducing the hardware requirements for a multiplier, and concomitantly to preserve the significant bits of convergence factor $R_3$, $B_4$ is preferably calculated according to the following methodology. Defining $\Delta_3=R_3-1$, then:

$$B_4=B_3(1+\Delta_3)=B_3+B_3\Delta_3=B_3+B_3\Delta'_3*2^{-j}$$

That is, $\Delta'_3$ represents the least significant bits of $R_3$ beyond the jth significant bit, and is multiplied (e.g., signed multiplication) by $B_3$. Then, addition of $B_3$ and $B_3\Delta_3$ may be performed by appropriately offsetting the product $B_3\Delta'_3$ using an adder that has the required width. It is understood, therefore, that the hardware and chip real estate requirements for the multiplier are reduced without suffering from truncation errors.

Returning to FIG. 8, Q' is shown as being applied to an input of adder 52 which receives as a second input the contents of register 51, which contains a value of $2^{-N+2}$ (i.e., a value more than $2^{-(N+M)}$ and less than $2^{-(N+1)}$). Thus, the output of adder 52, which is stored in register 53, is an overestimate Q". Register 54 is shown as storing Q'", the most significant N+1 bits from register 53, which has an error tolerance of less than plus or minus the weight of the guard bit (i.e., $2^{-(N+1)}$). Q'", therefore, is equivalent to simple rounding of the actual result to N+1 bits.

As described, the circuit of FIG. 8 generates the estimate Q'" from an approximation Q' that is generated as the result of a quadratically converging algorithm. It may be understood that additional processing speed advantages may be realized by combining in parallel some of the operations for generating the estimate Q'" with some of the operations of the quadratically converging algorithm for generating the approximation Q'. For instance, for the Goldschmidt algorithm discussed above, the approximation Q' is generated as follows.

$$Q'=B_4=B_3+B_3\Delta_3$$

This calculation requires two sequential steps: first determining the product, then performing the addition. Then, generating an overestimate Q" from the approximation Q' requires a third step of incrementing Q' by, for example, $2^{-(N+2)}$. These three sequential steps may be reduced to two sequential steps as follows.

In a first step, two operations are performed in parallel: third order approximate quotient $B_3$ is incremented by, for example, $2^{-(N+2)}$ (i.e., incremented by an amount less than $2^{-(N+1)}$ and greater than $2^{-(N+M)}$); and the product $B_3\Delta_3$ is formed. Then, in a second step the product $B_3\Delta_3$ is added to the incremented third order approximate quotient $B_3$, thus forming the overestimate Q". Although three operations must still be performed, the first two operations may be performed in parallel since they are independent. Thus, the three operations may be performed in two sequential steps, reducing processing time. Implementation of this preferred embodiment for generating Q" (from which Q'" is directly obtained) is apparent to one skilled in the art, and for instance, may be accomplished by circuitry such as that shown in FIG. 8 adapted to route the output of adder 52 back to one of the input registers for the adder. In the first step, adder 52 would produce the sum of $B_3$ incremented by $2^{-(N+2)}$, the sum being routed back to one of the input registers, while a multiplier would produce the product $B_3\Delta_3$ which would be loaded into the other input register of adder 52. Then, in the next step, adder 52 would produce the overestimate Q". It can also be understood that the circuitry shown in FIG. 8, including adder 52 and related registers, may be common elements to those used for implementing the quadratically converging algorithm (e.g., the Goldschmidt division algorithm described above), and that implementing such common circuitry under appropriate control, including the addition of related circuitry (e.g., for routing adder output to one of the adder inputs or to a multiplier input, for selecting one of a plurality of sources as an adder or multiplier input, etc.) is apparent to one with ordinary skill in the art.

Figure 9:
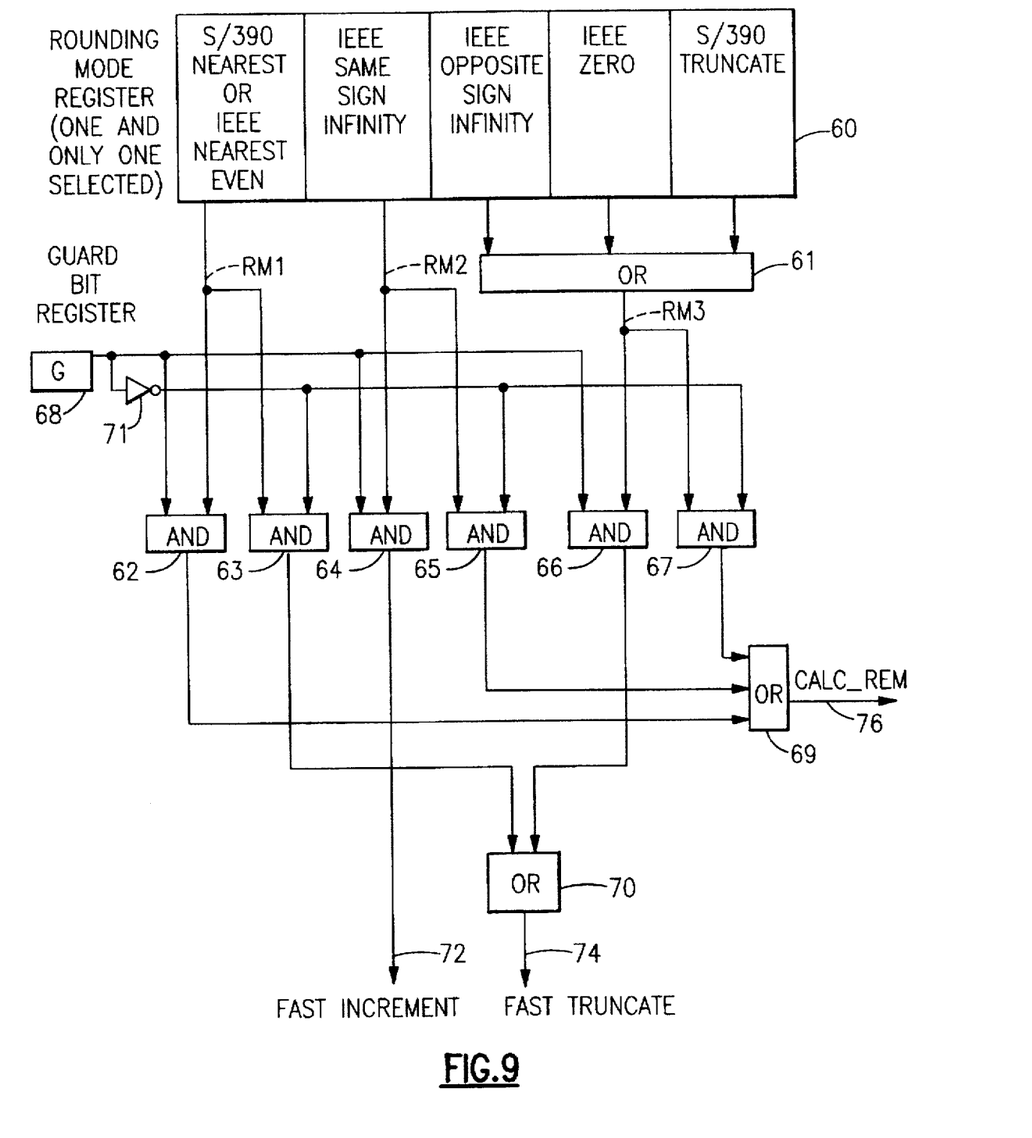
FIG. 9 illustrates circuitry for generating, according to the selected rounding mode and the value of the guard bit, signals used for selecting an appropriate exactly rounded result independently of a remainder indicative signal (i.e., a signal indicative of a relationship between a remainder and zero), and a signal indicative of whether a remainder indicative signal must be generated, in accordance with an embodiment of the present invention.

Referring now to FIG. 9, there is shown circuitry for generating FAST INCREMENT signal on line 72, FAST TRUNCATE signal on line 74, and CALC_REM signal on line 76 according to the selected rounding mode and the value of the guard bit. Register 60 contains 5 bits, each corresponding to a respective rounding mode, one of the bits having a logic 1 (e.g., high) value indicating that the corresponding rounding mode is selected, and the remaining bits having a logic 0 (e.g., low) value. The possible rounding modes shown in this example are: IBM System/390 Round to Nearest, IEEE 754 Standard Round to Nearest Even, IEEE 754 Standard Round to Infinity/Same Sign, IEEE 754 Standard Round to Infinity/Opposite Sign, IEEE 754 Standard Round to Zero, and IBM System/390 Truncate. It is noted that IBM System/390 Round to Nearest is essentially the same as IEEE 754 Standard Round to Nearest Even, since it can be proven that there are no half way cases for division or square root operations when the guard bit equals one, as mentioned above.

The bit of register 60 corresponding to the IBM System/390 Round to Nearest mode (or the IEEE 754 Standard Round to Nearest Even mode) is input (denoted as signal RM1) into AND gate 62 and AND gate 63. The bit of register 60 corresponding to the IEEE 754 Standard Round to Infinity/Same Sign is input (denoted as signal RM2) into AND gate 64 and AND gate 65. The bits of register 60 corresponding to the last three modes are input to OR gate 61, since the exactly rounded result is generated in the same way for each of these modes, and the output of OR gate 61, denoted as signal RM3, is input into AND gate 66 and AND gate 67. As described above, Round to Infinity/Same Sign refers to either Round to Positive Infinity with Q positive (as determined, for example, by the exclusive-OR of the dividend and divisor sign bits) or Round to Negative Infinity with Q negative. Also, Round to Infinity/Opposite Sign refers to either Round to Positive Infinity with Q negative or Round to Negative Infinity with Q positive.

Also shown in FIG. 9 is guard bit register 68 containing the value of the guard bit, and which may represent the guard bit location of register 54 shown in FIG. 8. The guard bit is input as the second input to each of AND gates 62, 64, and 66, while the inverted guard bit provided by inverter 71 is input as the second input to each of AND gates 63, 65, and 67. The outputs of AND gates 62, 65, and 67 are input into OR gate 69, which provides the CALC_REM signal on line 76.

As a result of this logical circuit arrangement, only one of FAST INCREMENT signal on line 72, FAST TRUNCATE signal on line 74, and CALC_REM signal will be logic 1 at any given time (i.e., orthogonal extended). In particular, the FAST INCREMENT signal will be logic 1 when: the IEEE 754 Standard Round to Infinity/Same Sign mode is enabled and the guard bit is a 1. The FAST TRUNCATE signal will be logic 1 when: the Round to Nearest mode RM1 is selected and the guard bit is 0; or signal RM3 is logic 1 and the guard bit is 1. The CALC_REM signal is logic 1 when: RM3 is logic 1 and the guard bit is 0; or IEEE 754 Standard Round to Infinity Same Sign is enabled (i.e., signal RM2 is high) and the guard bit is 0; or the Round to Nearest mode (RM1) is selected and the guard bit is 1.

Figure 10:
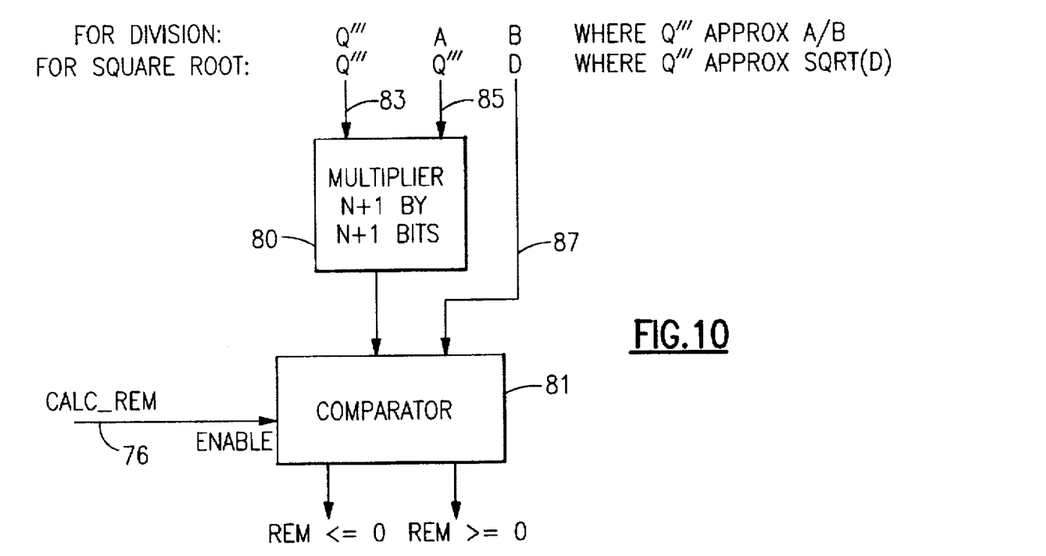
FIG. 10 shows circuitry for conditionally generating a signal representing a relationship between zero and a remainder (i.e., a remainder indicative signal), in accordance with an embodiment of the present invention.

Turning now to FIG. 10, there is shown circuitry for determining a relationship between zero and a remainder to the square root or division operation, and providing a remainder output signal indicative of the relationship thereof. It is first noted that a relationship between a remainder and zero may be determined in different ways. For example, for division, this may include comparing the product of the dividend with the product of the divisor and calculated quotient, including comparing subsets of bits from such a product and from the divisor, or any other operations which are indicative of such a relationship. Accordingly, as used herein, a signal indicative of the relationship between a remainder and zero is generally referred to as a remainder indicative signal, but is also referred to as a remainder signal or remainder output signal. In this embodiment, multiplier 80 is N+1 by N+1 bits (i.e., having N+1 bit input 83 and N+1 bit input 85) and therefore, is directly applicable to calculating the product $Q'''_{N+1} * Q'''_{N+1}$ as part of determining a relative remainder value for square root operations, as well as calculating the product of $Q'''_{N+1} * A_N$ as part of determining a relative remainder value for division operations. The output of multiplier 80 is furnished to comparator 81 and compared to the signal provided to comparator input 87. When determining the relative remainder value (e.g., relative to zero) for rounding of a division operation, input 87 is provided with the divisor/numerator (i.e., defined above as B), while when determining the relative remainder value for rounding of a square root operation, input 87 is provided with the square value (i.e., defined above as D). Multiplier inputs 83 and 85, and comparator input 87 may be obtained from separate registers which contain the appropriate quantities. In the case of a square root operation there may alternatively be a means (e.g., switches) for routing the contents of a single register containing Q''' to both multiplier inputs 83 and 85. It can also be understood, that multiplier 80 and/or comparator 81 may be common elements to those used for implementing the quadratically converging algorithm (e.g., the Goldschmidt division algorithm described above).

The CALC_REM signal on line 76, generated by the circuitry shown in FIG. 9, is input as an enable signal to comparator 81. When the CALC_REM signal is logic 0 (low), both comparator 81 outputs REM≦0 and REM≧0 are logic 0, regardless of any inputs to the comparator 81. When the CALC_REM signal is logic 1 (high), the comparator is enabled, and outputs REM≦0 and REM≧0 will be: logic 1 and logic 0, respectively, when the remainder is less than zero; logic 0 and logic 1, respectively, when the remainder is greater than zero; and both logic 1 when the remainder equals zero. It may be appreciated that in accordance with an embodiment of the present invention, multiplier 80 begins executing the appropriate multiplication upon receiving the inputs thereto, regardless of whether a remainder indicative signal (i.e., a signal representing the relationship of the remainder to zero) is needed, and that comparator 81 is selectively enabled to provide the remainder indicative signal. Alternative embodiments may use the CALC_REM signal to selectively enable the multiplier 80 to begin multiplication; however, initiating the multiplication before ascertaining whether a remainder indicative signal is needed for rounding generally reduces latency for cases where a remainder indicative signal is needed.

Figure 11:
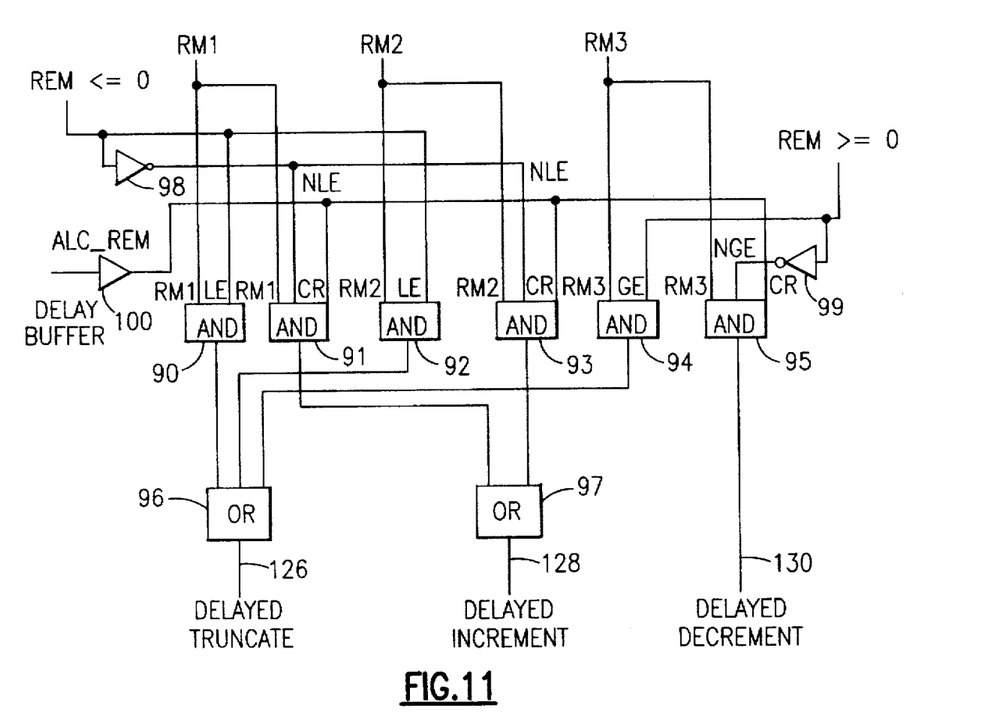
FIG. 11 illustrates circuitry for generating signals used for selecting an appropriate exactly rounded result according to outputs from the remainder circuitry shown in FIG. 10 and to the rounding mode, in accordance with an embodiment of the present invention.

FIG. 11 illustrates circuitry for generating DELAYED TRUNCATE signal on line 126, DELAYED INCREMENT signal on line 128, and DELAYED DECREMENT signal on line 130 according to outputs REM≦0 and REM≧0 and to the rounding mode represented by signals RM1, RM2, and RM3. Output REM≦0 on line 82 is input into AND gates 90, 92, and 95, and is also input to inverter 98, the output of which is input into AND gates 91 and 93. Rounding mode signal RM1 is input as the second input to AND gate 90 and as the second input to AND gate 91, while rounding mode signal RM2 is input as the second input to AND gate 92 and as the second input to AND gate 93. Output REM≧0 on line 84 is input into AND gates 91, 93, and 94, and is also input to inverter 99, the output of which is input into AND gate 95. Rounding mode signal RM3 is input as the second input to AND gate 94 and as the second input to AND gate 95. The respective outputs of AND gates 90, 92, and 94 are connected as inputs to OR gate 96, which generates a DELAYED TRUNCATE signal. The respective outputs of AND gates 91, and 93 are connected as inputs to OR gate 97, which generates a DELAYED INCREMENT signal. The output of AND gate 95 generates a DELAYED DECREMENT signal.

Accordingly, it is understood that when CALC_REM is logic 0, and thus REM≦0 and REM≧0 are both logic 0, that each of the DELAYED TRUNCATE, DELAYED INCREMENT, and DELAYED DECREMENT signals is logic 0. If, however, CALC_REM is high, then only one of the DELAYED TRUNCATE, DELAYED INCREMENT, and DELAYED DECREMENT signals will be high, depending on which of rounding modes signals RM1, RM2, and RM3 is high and on the states of REM≦0 and REM≧0. That is, DELAYED TRUNCATE will have a high value when: RM1 is high and REM≦0 is high; or RM2 is high and REM≦0 is high; or RM3 is high and REM≧0 is high. DELAYED INCREMENT will have a high value when: RM1 is high, REM≦0 is low, and REM≧0 is high; or RM2 is high, REM≦0 is low, and REM≧0 is high. DELAYED DECREMENT will have a high value when RM3 is high, REM≧0 is low, and REM≦0 is high. It may also be appreciated that when both REM≦0 and REM≧0 are high (i.e., remainder equal to zero) only the appropriate one of the DELAYED TRUNCATE, DELAYED INCREMENT, and DELAYED DECREMENT signals will be high because only one of rounding mode signals RM1, RM2, and RM3 has a high value, and the AND gates 91, 93, and 95 corresponding to the rounding mode signals RM1, RM2, and RM3, respectively, each receive an inverted remainder signal (i.e., either inverted REM≦0 or inverted REM≧0) as one of their inputs.

Figure 12:
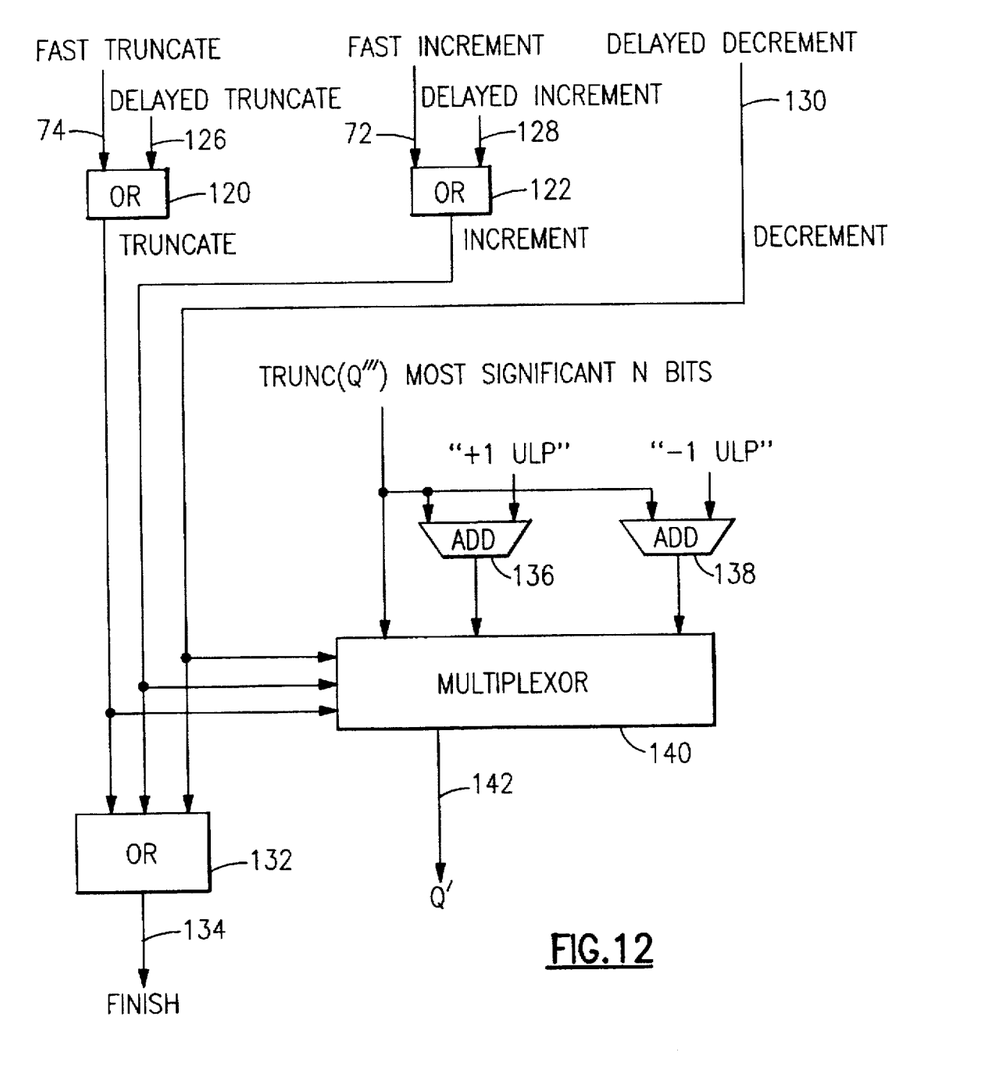
FIG. 12 depicts circuitry for selecting an exactly rounded result for the given rounding mode, in accordance with an embodiment of the present invention.

FIG. 12 depicts circuitry for selecting an exactly rounded result for the given rounding mode. The N most significant bits of Q''' (e.g., from register 54), referred to as Trunc(Q'''), are input to a first input port of multiplexer 140, to adder 136, and to adder 138. Adder 136 increments Trunc(Q''') by 1 ulp, and the output of adder 136 is input into a second port of multiplexer 140. Adder 138 decrements Trunc(Q''') by 1 ulp, and the output of adder 138 is input into a third port of multiplexer 140.

Which of the multiplexer 140 input port signals is transferred to multiplexer 140 output line 142 as the exactly rounded result Q* is determined by the TRUNCATE, INCREMENT, and DECREMENT select signals that are input to multiplexer 140. Only one of the TRUNCATE, INCREMENT, and DECREMENT select signals will have a high logic value at any given time. TRUNCATE select signal is high when either the FAST TRUNCATE signal or the DELAYED TRUNCATE signal is high, in accordance with operation of OR gate 120, and a high TRUNCATE select signal results in the Trunc(Q''') signal applied to the first input port of multiplexer 140 being provided to multiplexer 140 output line 142. INCREMENT select signal is high when either the FAST INCREMENT signal or the DELAYED INCREMENT signal is high, in accordance with operation of OR gate 122, and a high INCREMENT select signal results in the Trunc(Q''')+1 signal applied to the second input port of multiplexer 140 being provided to multiplexer 140 output line 142. DECREMENT select signal is high only when the DELAYED DECREMENT signal is high, and a high DECREMENT select signal results in the Trunc(Q''')−1 signal applied to the third input port of multiplexer 140 being provided to multiplexer 140 output line 142. In addition, the TRUNCATE, INCREMENT, and DECREMENT select signals are input to OR gate 132, which thus generates a FINISH signal on line 134 when a rounding operation is completed.

It is understood, therefore, that for any one of the rounding modes selected according to register 60, the circuitry shown and described in FIGS. 8–12 provides an exactly rounded result for a division or square root operation in accordance with implementing a method of the present invention of generating an approximate result having one an additional bit (i.e., the guard bit) compared with the exactly rounded result, and having an error magnitude less than the weight of the guard bit; and providing an exactly rounded result based on the value of the guard bit and the rounding mode, independently of a remainder indicative signal for predetermined combinations of the designated rounding mode and the value of the guard bit. That is, in about half of the cases, a FAST TRUNCATE or FAST INCREMENT signal is generated which is used immediately to select the appropriate result from the inputs applied to multiplexer 140. In the remaining cases, a CALC_REM signal is generated, requiring the result of a relative remainder value calculation before a DELAYED TRUNCATE, DELAYED INCREMENT, or DELAYED DECREMENT signal is generated and used to select the appropriate result from the inputs applied to multiplexer 140. In accordance with a feature of the present invention, it may therefore be appreciated that in about half the cases, processing for generating a remainder indicative signal is eliminated in providing an exactly rounded result from a preliminary result of a quadratically converging algorithm, and concomitantly the exactly rounded result is provided at a time earlier than if it were necessary to generate the remainder indicative signal (i.e., to calculate the relationship of a remainder to zero). Overall latency is therefore reduced.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. For instance, one skilled in the art recognizes that common hardware elements (e.g., multiplier, adder, registers) may be used for implementing a quadratically converging algorithm and the rounding method of the present invention. A specific example would be using the same multiplier and adder for calculating the remainder and for implementing the quadratically converging algorithm. Furthermore, the invention may be implemented using a general purpose computer, including an arithmetic logic unit (ALU) and registers of appropriate width, under microprogram or other software control. Alternatively, a conventional floating point processor may be adapted, for example by modified microprogram control, to implement the present invention. It is therefore intended that the present invention is not limited to the disclosed embodiments but should be defined in accordance with the claims which follow.

I claim:

1. A system that provides, for a designated rounding mode, an exactly rounded result having a predetermined number of bits for a square root or a division operation, the exactly rounded result representing rounding in the designated rounding mode of an infinitely precise result to the division or square root operation, the system comprising:

a first storage unit that contains information indicative of the designated rounding mode;

a second storage unit that contains an approximate result to the division or square root operation, the approximate result having one more bit of precision than the exactly rounded result to the division or square root operation, and having an error with a magnitude less than the weight of the least significant bit of the approximate result and with an arbitrary sign, the least significant bit of the approximate result called a guard bit, the approximate result exclusive of the guard bit called a truncated approximate result;

a remainder circuit that provides a remainder output signal representative of a difference between the infinitely precise result and the approximate result to the division or square root operation;

a selection signal generating circuit that generates a selection signal, wherein for a predetermined combination of said guard bit and the information indicative of the designated rounding mode said selection signal is generated independently of said remainder output signal, and wherein for another predetermined combination of said guard bit and the information indicative of the designated rounding mode said selection signal is generated in response to the information indicative of the designated rounding mode and the remainder output signal; and a rounding circuit that provides the exactly rounded result in response to said selection signal, the exactly rounded result being generated from the approximate result and having a value dependent on the selection signal, the exactly rounded result thereby being provided without dependence on said remainder output signal for said predetermined combination of said guard bit and the information indicative of the designated rounding mode.

2. The system according to claim 1, wherein said remainder circuit is selectively enabled to provide the remainder output signal in response to a remainder calculation signal generated by said selection signal generating circuit, and wherein said selection signal generating circuit does not activate the remainder calculation signal when the selection signal is generated independently of said remainder output signal, and wherein said selection signal generating circuit activates the remainder calculation signal when the selection signal is generated in response to the information indicative of the designated rounding mode and the remainder output signal.

3. The system according to claim 1, wherein said rounding circuit comprises:

an incrementing unit, coupled to said second storage unit, that provides an output equal to the truncated approximate result incremented by one unit in the least significant bit, thereby providing an incremented approximate result;

a decrementing unit, coupled to said second storage unit, that provides an output equal to the truncated approximate result decremented by one unit in the least significant bit, thereby providing a decremented approximate result;

a multiplexing unit having an output selected as one of a plurality of inputs, wherein a first input receives the truncated approximate result, a second input receives the incremented approximate result, and a third input receives the decremented approximate result, and wherein a selection signal input receives said selection signal, the output of the multiplexing unit selected as one of said first, second, and third inputs in response to said selection signal.

4. The system according to claim 1, further comprising an approximation unit that calculates said approximate result.

5. The system according to claim 4, wherein said approximation unit comprises:

a multiplier;

an adder coupled to said multiplier;

a memory, coupled to said multiplier, that includes a stored table of divisor reciprocal values for division operation and/or a stored table of square root reciprocal values for square root operation;

a control circuit coupled to said multiplier, said adder, and said memory, and adapted to implement a quadratically converging algorithm to provide a preliminary result having a predetermined number of correct bits for the division or square root operation and adapted to increment the preliminary result by a value less than the weight of a bit having one more bit of precision than the exactly rounded result and greater than the weight of the least significant correct bit of said preliminary result.

6. The system according to claim 1 wherein for exactly rounding a result of a division or square root operation according to IEEE 754-1985 binary floating point standard said rounding circuit provides the exactly rounded result as the:

N most significant bits of the approximate result, referred to as the truncated approximate result, when the designated rounding mode is round to nearest even and the guard bit is zero, said selection signal generated independently of the remainder output signal;

truncated approximate result incremented by one unit in the least significant bit, referred to as an incremented approximate result, when the designated rounding mode is round to nearest even and the guard bit is one and the remainder is positive, said selection signal generated according to the designated rounding mode and the remainder output signal;

truncated approximate result when the designated rounding mode is round to nearest even and the guard bit is one and the remainder is negative, said selection signal generated according to the designated rounding mode and the remainder output signal;

incremented approximate result when the designated rounding mode is round to positive infinity and the infinitely precise result is positive and the guard bit is one, said selection signal generated independently of the remainder output signal;

incremented approximate result when the designated rounding mode is round to negative infinity and the infinitely precise result is negative and the guard bit is one, said selection signal generated independently of the remainder output signal;

truncated approximate result when the designated rounding mode is round to positive infinity and the infinitely precise result is positive and the guard bit is zero and the remainder is less than or equal to zero, said selection signal generated according to the designated rounding mode and the remainder output signal;

truncated approximate result when the designated rounding mode is round to negative infinity and the infinitely precise result is negative and the guard bit is zero and the remainder is less than or equal to zero, said selection signal generated according to the designated rounding mode and the remainder output signal;

incremented approximate result when the designated rounding mode is round to positive infinity and the infinitely precise result is positive and the guard bit is zero and the remainder is greater than zero, said selection signal generated according to the designated rounding mode and the remainder output signal;

incremented approximate result when the designated rounding mode is round to negative infinity and the infinitely precise result is negative and the guard bit is zero and the remainder is greater than zero, said selection signal generated according to the designated rounding mode and the remainder output signal;

truncated approximate result when the designated rounding mode is round to positive infinity and the infinitely precise result is negative and the guard bit is one, said selection signal generated independently of the remainder output signal;

truncated approximate result when the designated rounding mode is round to negative infinity and the infinitely precise result is positive and the guard bit is one, said selection signal generated independently of the remainder output signal;

truncated approximate result when the designated rounding mode is round to positive infinity and the infinitely precise result is negative and the guard bit is zero and the remainder is greater than or equal to zero, said selection signal generated according to the designated rounding mode and the remainder output signal;

truncated approximate result when the designated rounding mode is round to negative infinity and the infinitely precise result is positive and the guard bit is zero and the remainder is greater than or equal to zero, said selection signal generated according to the designated rounding mode and the remainder output signal;

truncated approximate result decremented by one unit in the least significant bit, referred to as the decremented approximate result, when the designated rounding mode is round to positive infinity and the infinitely precise result is negative and the guard bit is zero and the remainder is less than zero, said selection signal generated according to the designated rounding mode and the remainder output signal;

decremented approximate result when the designated rounding mode is round to negative infinity and the infinitely precise result is positive and the guard bit is zero and the remainder is less than zero, said selection signal generated according to the designated rounding mode and the remainder output signal;

truncated approximate result when the designated rounding mode is round to zero and the guard bit is one, said selection signal generated independently of the remainder output signal;

truncated approximate result when the designated rounding mode is round to zero and the guard bit is zero and the remainder is greater than or equal to zero, said selection signal generated according to the designated rounding mode and the remainder output signal;

decremented approximate result when the designated rounding mode is round to zero and the guard bit is zero and the remainder is less than zero, said selection signal generated according to the designated rounding mode and the remainder output signal.

7. The system according to claim 1 wherein for exactly rounding a result of a division or square root operation according to IBM S/390 binary floating point standard said rounding circuit provides the exactly rounded result as the:

N most significant bits of the approximate result, referred to as the truncated approximate result, when the designated rounding mode is round to nearest and the guard bit is zero, said selection signal generated independently of the remainder output signal;

truncated approximate result incremented by one unit in the least significant bit, referred to as an incremented approximate result, when the designated rounding mode is round to nearest and the guard bit is one and the remainder is positive, said selection signal generated according to the designated rounding mode and the remainder output signal;

truncated approximate result when the designated rounding mode is round to nearest and the guard bit is one and the remainder is negative, said selection signal generated according to the designated rounding mode and the remainder output signal;

truncated approximate result when the designated rounding mode is truncate and the guard bit is one, said selection signal generated independently of the remainder output signal;

truncated approximate result when the designated rounding mode is truncate and the guard bit is zero and the remainder is greater than or equal to zero, said selection signal generated according to the designated rounding mode and the remainder output signal;

decremented approximate result when the designated rounding mode is truncate and the guard bit is zero and the remainder is less than zero, said selection signal generated according to the designated rounding mode and the remainder output signal.

8. A system that provides, for a designated rounding mode, an exactly rounded result having a predetermined number of bits for a square root or a division operation, the system comprising:

an approximation unit that calculates an approximate result having one more bit of precision than the desired exactly rounded result to the division or square root operation, and having an error with a magnitude less than the weight of the least significant bit of the approximate result and with an arbitrary sign; and a processor that, in predetermined cases characterized by the designated rounding mode and the least significant bit of the approximate result, exactly rounds the approximate result based on the least significant bit of the approximate result and on the designated rounding mode, independent of a computation indicative of a remainder.

9. A system for providing an N bit exactly rounded result, according to a designated rounding mode, for a square root or a division operation, the exactly rounded result representing rounding in the designated rounding mode of an infinitely precise result to the division or square root operation, N having a nonzero positive value, the system comprising:

means for generating an N+1 bit estimate to the infinitely precise result of the square root or division operation, said estimate having an error difference from said infinitely precise result with a magnitude less than the weight of the least significant (N+1)th bit, referred to as the guard bit; and means for providing the exactly rounded result according to the designated rounding mode and the value of the guard bit, independently of a remainder signal representative of a difference between the infinitely precise result and the estimate to the division or square root operation, for a predetermined combination of the guard bit and the designated rounding mode.

* * * * *